United States Patent [19]

Poelker et al.

[11] Patent Number: 6,100,221

[45] Date of Patent: Aug. 8, 2000

[54] AQUEOUS EXTERNAL CRYSTAL MODIFIER DISPERSION

[75] Inventors: David J. Poelker, Belleville, Ill.; Timothy J. Baker, Claremore, Okla.; Jeffrey W. Germer, Edwardsville, Ill.

[73] Assignee: Baker Hughes Incorporated, Houston, Tex.

[21] Appl. No.: 09/189,334

[22] Filed: Nov. 9, 1998

Related U.S. Application Data

[63] Continuation of application No. 08/705,461, Aug. 29, 1996, Pat. No. 5,858,927.

[51] Int. Cl.$^7$ ............... C09K 3/00; C09K 7/00; E21B 43/00

[52] U.S. Cl. ............. 507/90; 507/221; 507/224; 507/261; 507/931; 166/304

[58] Field of Search ............... 507/90, 221, 224, 507/261, 931; 166/304

[56] References Cited

U.S. PATENT DOCUMENTS

| | | |
|---|---|---|
| 2,561,232 | 7/1951 | Rudel et al. . |
| 3,383,326 | 5/1968 | Seale et al. . |
| 3,574,575 | 4/1971 | Gee et al. . |
| 3,634,052 | 1/1972 | Gee et al. . |
| 3,682,249 | 8/1972 | Fischer et al. . |
| 3,724,553 | 4/1973 | Snavely, Jr. et al. . |
| 3,776,248 | 12/1973 | Titus . |
| 4,212,754 | 7/1980 | Chibnik . |
| 4,219,431 | 8/1980 | Chibnik . |
| 4,646,837 | 3/1987 | Kruka . |
| 4,668,408 | 5/1987 | McClaflin et al. . |
| 4,746,328 | 5/1988 | Sakamoto et al. . |
| 4,755,230 | 7/1988 | Ashton et al. . |
| 4,925,497 | 5/1990 | Thierheimer, Jr. . |
| 4,964,468 | 10/1990 | Adams et al. . |
| 4,997,580 | 3/1991 | Karydas et al. . |
| 5,027,901 | 7/1991 | French et al. . |
| 5,062,992 | 11/1991 | McCullough . |
| 5,152,177 | 10/1992 | Buck et al. . |
| 5,183,581 | 2/1993 | Khalil et al. . |
| 5,284,493 | 2/1994 | Baillargeon et al. . |
| 5,459,125 | 10/1995 | Ohlsen et al. . |
| 5,504,063 | 4/1996 | Becker et al. . |
| 5,858,927 | 1/1999 | Poelker et al. ............... 507/90 |

OTHER PUBLICATIONS

The HLB System, ICI Americas Inc. (1976, Rev. 1980).
Gillies, M.T., Chemical Additives For Fuels, Noyes Data Corporation, 115–152 (1982).
Research Disclosure, Jul. 1995, p. 501, Entry 37550.
McKay, Robert B., Technological Applications Of Dispersions, Surfactant Science Series 52, 294–295.

Primary Examiner—Philip Tucker
Attorney, Agent, or Firm—Howell & Haferkamp, L.C.

[57] ABSTRACT

An aqueous external dispersion comprising a wax dispersant and an organic crystal modifier composition dispersed through a continuous water phase is useful as a crystal modifier for petroleum or a petroleum-derived liquid. The dispersant comprises a non-ionic surfactant and is present in the dispersion in an amount sufficient to impart at least meta-stability to the dispersion. The dispersion has a viscosity at 25° C. of less than about 50,000 centipoise.

42 Claims, No Drawings

AQUEOUS EXTERNAL CRYSTAL MODIFIER DISPERSION

This application is a continuation of Ser. No. 08/705,461 filed Aug. 29, 1996 now U.S. Pat. No. 5,858,927.

BACKGROUND OF THE INVENTION

1. Field of the Invention

The present invention relates to crystal modifiers, and more particularly to crystal modifiers useful as cold flow improvers, pour point depressants, viscosity reducers, paraffin deposition inhibitors and the like for treatment of petroleum and petroleum-derived liquids.

2. Description of the Prior Art

Petroleum (crude oil) as it is produced from underground oil formations often is difficult to handle, particularly in cold weather. For example, it is common that paraffin deposition and/or increased viscosity or pour point render pumping difficult. Similarly, handling difficulties frequently persist in liquids derived from petroleum, such as automotive oils, certain fuels and lubricating oil.

As a result, crystal modifiers are added to such liquids to improve the handling characteristics. In relatively low concentration, the crystal modifier may be used, for example, as cold flow improver or viscosity reducer to improve the flow of liquids such as petroleum and petroleum derived liquids at low temperature. In sufficient concentration, crystal modifiers lower the pour point of the liquid and so often are termed "pour point depressants" in such situations. The crystal modifier also may prevent waxes (paraffin) from building up in production equipment and thereby hindering operations.

Crystal modifiers interfere with crystal formation in fluids and so, depending on the fluid and situation, act as cold flow improvers, pour point depressants, viscosity reducers, paraffin deposition inhibitors and the like. A variety of crystal modifiers are known in the art, and are generally identified by their function, such as cold flow improver, pour point depressant, viscosity reducer or paraffin deposition inhibitor. For example, the dialkylalkenylsuccinates of U.S. Pat. No. 2,561,232 to Rudel et al. and assigned to Standard Oil Development Company have been known as effective pour point depressants for petroleum derived liquids since at least as early as 1951. U.S. Pat. Nos. 3,574,575 and 3,634,052, both of which were assigned to Mobil Corp., and the text, *Chemical Additives for Fuels: Developments Since* 1978, edited by M. T. Gillies (Noyes Data Corporation 1982), pages 115–152, each of which is incorporated herein by reference, disclose other types of crystal modifiers. Recently, polymer compositions comprising dispersions of at least one olefinically unsaturated compound and containing aliphatic side chains of at least ten carbon atoms (e.g., a polyacrylate or a polyethylene vinyl acetate related product), in a continuous liquid phase comprising at least two surfactants and a liquid polyol was disclosed anonymously in *Research Disclosure* (July 1995), page 501 (entry 37550), as being effective pour point depressants in crude oil (petroleum) and certain fuel oils. That disclosure calls for removal of the organic solvents, dissolution in glycerin and emulsification in water so that the composition is not hydrocarbon-based.

Conventional crystal modifier technology, however, suffers from various drawbacks in treating petroleum and petroleum-derived liquids. For instance, the active ingredient of crystal modifiers often is a solid or highly viscous liquid. Thus, the active ingredient suffers from the very problems it is intended to solve: it is difficult to handle; that is, removal of the crystal modifier from tanks, whether stationary or on trucks, after storage or transport, and pumping of the crystal modifiers to the locus of treatment can be extremely difficult or impossible.

Therefore, conventional crystal modifier compositions often are low concentration mixtures or solutions of the active ingredient in a solvent, usually an aromatic hydrocarbon such as xylene bottoms. Of course, this resolution in turn raises other disadvantages, including higher costs and difficulties attendant the purchase of large quantities of solvent and attendant the storage, transportation and application of large volumes of liquid for relatively low treatment rates. Moreover, the use of large quantities of solvent also increases the resulting amount of undesirable organic waste. In addition, if the additive composition is a dilute solution, it may have to be added continuously in order to afford continuous treatment. Because continuous treatment requires addition on-site equipment, operation and presence, it is desirable that the composition be added by a batch application, with slow release of the active ingredient affording continuous treatment.

Attempts to respond to the problems encountered in diluting or dissolving the active crystal modifier in large volumes of solvent have included the use of water-in-oil inverse emulsions such as disclosed in U.S. Pat. No. 5,027,901. The composition described in the *Research Disclosure* article identified above appears to be such a inverse emulsion. However, the reverse emulsions are still very viscous and so do not resolve the handling problem to anywhere close to complete satisfaction. Further, as used conventionally, reverse emulsions have not been known to provide a means for slow release of the active ingredient which could allow continuous treatment from a batch application. Moreover, such prior art compositions require undesirably high flush rates for insertion downhole in oil wells.

SUMMARY OF THE INVENTION

The present invention, therefore, is directed to a novel aqueous external dispersion useful as a crystal modifier for petroleum or a petroleum-derived liquid. The dispersion comprises a wax dispersant and an organic crystal modifier composition dispersed through a continuous water phase. The dispersant is present in the dispersion in an amount sufficient to impart at least meta-stability to the dispersion. The dispersion has a viscosity at 25° C. of less than about 50,000 centipoise.

The present invention is also directed to a novel method for crystal modification of petroleum or a petroleum-derived liquid by adding the noted aqueous external dispersion to the petroleum or petroleum-derived liquid.

The present invention is further directed to a novel method for treating an oil well for crystal modification of petroleum in the well. According to the method, the noted aqueous external dispersion is injected into the well annulus in a batch process and flushed into the well to a desired location for extended treatment.

The present invention is further directed to a novel method for preparation of an aqueous external dispersion useful as a crystal modifier for petroleum or a petroleum-derived liquid. According to the method, a wax dispersant comprising a non-ionic surfactant and an organic crystal modifier composition are combined and heated to form a liquid organic phase in which the dispersant is present in an amount sufficient to impart at least meta-stability to the resulting dispersion. Then, the organic phase is added to water at a rate of addition and with sufficient agitation and with the water at a temperature to disperse the organic phase throughout the water in an organic phase weight average particle size of less than about 10 microns. A dispersion comprising the dispersant and the organic crystal modifier composition dispersed through a continuous water phase, and having a viscosity at 25° C. of less than about 50,000 centipoise, is thereby produced.

Among the several advantages of this invention, may be noted the provision of a crystal modifier composition of suitably low viscosity for ease of handling; the provision of a crystal modifier composition that requires lower flush rates than do prior art compositions for insertion of the composition downhole in oil wells; the provision of a crystal modifier composition that contains lower amounts of aromatic hydrocarbon solvents than many prior art compositions; the provision of a crystal modifier composition that may be employed in a batch application that provides slow release of the active ingredient for continuous treatment over substantial periods of time; the provision of a method for crystal modification of petroleum and petroleum-derived liquids by application of a crystal modifier composition that is easier to handle than prior art compositions; the provision of such method that produces less aromatic hydrocarbon waste than prior art methods; the provision of such method that involves a batch application resulting in relatively long term continuous treatment; the provision of such method that is effective for treating an oil well for crystal modification of petroleum in the well; and the provision of a method for preparation of such crystal modifier compositions useful in such methods.

DETAILED DESCRIPTION OF THE PREFERRED EMBODIMENTS

In accordance with the present invention, it has been discovered that a relatively low viscosity aqueous external dispersion comprising a wax dispersant and an organic crystal modifier composition dispersed through a continuous water phase can be prepared and used effectively for crystal modification of petroleum or a petroleum-derived liquid. By "dispersion", what is meant is solid in liquid dispersions as well as liquid in liquid emulsions. By "crystal modification", what is meant is cold flow improvement, pour point depression, viscosity reduction and/or paraffin deposit inhibition. By "meta-stability", what is meant is that the discontinuous (organic) phase remains dispersed through the continuous (water) phase (i.e., less than about 10% of the water separates from the organic phase) for at least a week. Accordingly, the phrase "at least meta-stability" refers to such meta-stability or true stability. In general, the organic phase of the dispersions of this invention remain disperse for more than a month, usually more than three months, allowing it to be shipped and handled in a distribution system. However, once it is injected into a well annulus and flushed to the desired point in the well, it releases the crystal modifier slowly, providing extended, continuous treatment.

Thus, the dispersion, which is an emulsion if the dispersed phase is a liquid rather than a solid, need not be prepared at the site of the application. The dispersion has a viscosity at 25° C. of less than about 50,000 centipoise, typically about 5,000 to about 10,000 centipoise. Surprisingly, it has been found that this dispersion may be applied as a batch, yet it is of sufficiently low viscosity to render handling easy and to require relatively low flush rates for insertion into oil wells, and it releases the active ingredient at a relatively slow, constant rate to provide relatively long term continuous treatment.

The dispersion of this invention may be prepared as follows. A wax dispersant and an organic crystal modifier composition are combined to form an organic phase. By "wax dispersant", what is meant is a surfactant (or combination of surfactants) that disperses waxes or wax-like materials through an aqueous phase. In the case of a liquid crystal modifier, therefore, the wax dispersant is a wax (or "waxy") in water emulsifier. While the crystal modifier may not technically be a wax, it is "waxy" in nature. It will be readily recognized by those of ordinary skill in the art the types of surfactants that are likely to be effective dispersants in a particular oil in water system dependent, for example, on the hydrocarbon solvent present.

Thus, for instance, the preferred dispersant comprises a non-ionic surfactant and may, optionally, contain one or more other surfactants (ionic or non-ionic) as well. The preferred non-ionic surfactants are generally ethoxylated long hydrocarbon chain surfactants. By "long hydrocarbon chain", what is meant is eight or more, preferably twelve or more, especially eighteen or more carbon atoms.

Alternatively, however, especially when the dispersed phase is a solid, the dispersant, may be a shorter chain ethoxylated hydrocarbon surfactant (e.g., about six to about twelve carbon atoms) in combination with an ionic surfactant in a proportion such that the overall dispersant package (i.e., combination of surfactants/dispersants) has an HLB of about 6 to about 18, preferably about 6 to about 14, more preferably about 8 to about 12, such as about 9 to about 11, especially about 10, dependent, however, at least in part on the organic solvent, if any, present in the dispersion while an HLB of 10 is desirable if xylene solvents are present in the dispersion, another HLB may be desirable for another solvent such as kerosene. Appropriate HLB's for a wide range of solvents are known. Thus, such non-ionic surfactants with relatively shorter hydrocarbon chains, say six to twelve carbon atoms, tend to be suitable components for dispersants that also comprise an anionic surfactant such as dodecylbenzenesulfonic acid (DDBSA), while non-ionic surfactants of number average hydrocarbon chain lengths of at least about eighteen carbon atoms, such as about twenty to thirty, especially about twenty-four to about twenty-eight carbon atoms, have been found to be especially useful if the dispersant contains no ionic surfactant, particularly when the dispersed phase is a solid.

Preferred dispersants, particularly dispersants containing no surfactant having an ethoxylated hydrocarbon of chain of at least about eighteen carbon atoms, have a hydrophilic/lipophilic balance (HLB) of from about 6 to about 18, preferably from about 6 to about 14, more preferably from about 8 to about 12, such as from about 9 to about 11, preferably about 10, dependent, however, at least in part on the organic solvent, if any, present in the dispersion. If the dispersant contains a combination of surfactants, the HLB of the dispersant is considered herein to be the weight average of the HLB's of the individual surfactants. Those of ordinary skill in the art will readily recognize or determine the dispersants likely to be most effective for the particular system. When a solvent (e.g., a hydrocarbon) is present, the type of dispersant (surfactant) can be determined from the type of solvent. For example, HLB's suitable for various solvents in oil in water emulsions are well known and published, for instance, in *The HLB System,* by ICI Americas, Inc. (1976).

In view of these constraints, a particularly effective non-ionic surfactant, especially if used as the sole surfactant, has been found to be hydroxylated polymerized ethylene with a chain length distribution in the range of from about eight to about sixty carbon atoms, preferably about twelve to about forty carbon atoms, more preferably about eighteen to about forty carbon atoms, with a number average, for example, of from about twenty to about fifty carbon atoms, preferably about twenty to about thirty carbon atoms, more preferably about twenty-four to about twenty-eight carbon atoms, such as about twenty-four to about twenty-six carbon atoms. One suitable polymer that may be noted is an aliphatic alcohol having a number average backbone length of about 24 to about 26 carbon atoms ethoxylated with ethylene oxide in a weight ratio of ethylene oxide to the backbone of from about 1:0.5 to about 1:2, preferably approximately 1:1.

Non-ionic surfactants that have been found effective in combination with an anionic surfactant such as DDBSA include ethoxylated nonylphenol (4:1 molar ratio of ethylene oxide to nonylphenol) and an ethoxylated $C_{12-13}$ alkyl backbone (3:1 molar ratio of ethylene oxide to alkylate) such as is available from Shell under the trade designation Neodol 23-3. In such combinations, the relative amounts of non-ionic surfactant and DDBSA should be coordinated so that the HLB of the dispersant is about 6 to about 18, preferably about 6 to about 14, more preferably about 8 to about 12, especially about 9 to about 11, such as about 10.

In any event, the dispersant is coordinated with the system as will be readily seen by the ordinarily skilled artisan in the field of emulsions and dispersions. The dispersant and its concentration are selected to cause the oil phase to disperse through the water phase to achieve at least meta-stability. Generally, the dispersant concentration in the overall dispersions will be about 1% to about 15% by weight, depending on the dispersant, the oil phase and the ratio of oil to water.

It is believed that the organic crystal modifier composition may comprise any known crystal modifier useful for improving the cold flow of, depressing the pour point of, reducing the viscosity of, or inhibiting paraffin deposition in, petroleum and petroleum-derived liquids. Especially suitable crystal modifiers perform more than one of these functions and may also perform other functions as well, such as corrosion inhibition.

Particular crystal modifiers that have been found specifically to be suitable include those of the U.S. patents and the text that are identified in the Background section above and incorporated herein by reference. However, especially effective crystal modifiers in this invention are olefin/maleic anhydride copolymers, particularly α-olefin/maleic anhydride copolymers, whether in their acid, diacid, ester, diester, ester/acid, amide, imide or anhydride forms, or in a combination of forms, also have been found to be especially effective in this invention. Other types of crystal modifiers, including ethylene vinyl acetate copolymers (number average molecular weight of generally up to about 10,000), polyacrylates, and esters amides and imides thereof, are well known in the field as such or more specifically as cold flow improvers, pour point depressants, viscosity reducers or paraffin inhibitors. Generally, polymeric crystal modifiers have a weight average molecular weight of about 3,000 to about 10,000, preferably about 5,000 to about 10,000. Nevertheless, other crystal modifiers may be used, for example, crystal modifiers of U.S. Pat. No. 2,561,232 are aliphatic alcohol diesters of an alkenylsuccinic acid containing a single alkenyl group of 4 to 24 carbon atoms, in which the alcohol radicals are alkyl groups of 2 to 14 carbon atoms or alkoxy radicals of the type $C_4H_9(OCH_2CH_2)_nOH$, wherein n is 1 or 2. Such crystal modifiers may be used in the dispersions of this invention. Suitable ester crystal modifiers include aliphatic alcohol esters and have up to thirty carbon atoms, preferably about eighteen to about thirty carbon atoms, especially about twenty to about twenty-eight carbon atoms.

Thus, for example, the crystal modifier may be a polymeric ester such as a $C_{30}$ alpha olefin/maleic anhydride copolymer (an alternating copolymer of number average molecular weight about 5,000) 75 mole % esterified with $C_{20+}$ alcohols. Or it may be an imide derived from that polymer. In particular, an imide (of weight average molecular weight of 5,000) prepared by reacting a $C_{24-28}$ alpha olefin/maleic anhydride copolymer with ARMEEN HT (a hydrogenated tallow amine) has been found to be an effective cold flow improver/pour point depressant/viscosity reducer/paraffin inhibitor. Thus, by these and similar techniques, the polymers may be used not only in its anhydride, acid and diacid forms, but also in its ester, diester, acid/ester, amide and imide forms, including mixtures of such forms. Or the crystal modifier may be a polyacrylate as described in the *Research Disclosure* article noted above and incorporated herein by reference.

Generally the crystal modifier composition of this invention is a crystal modifier (or a combination of crystal modifiers) in an organic solvent, such as an aromatic solvent, especially an aromatic hydrocarbon such as xylene bottoms (mostly mesitylenes), kerosene, diesel fuel, naphthalenes and other heavy aromatics. However, whereas in prior art compositions, the crystal modifier is dissolved or dispersed in an aromatic typically in very low concentration in an effort to prepare a composition that can be handled, in the present invention the crystal modifier composition is dispersed through water, eliminating the need for much of the aromatics employed in the prior art techniques. Thus, crystal modifier compositions ranging from 3% active (that is, 3% by weight of the combination crystal modifier(s) and organic solvent is the crystal modifier(s)) to 87% active. Generally, use of crystal modifier compositions at least about 10% active, preferably at least about 20% active, especially about 20% to about 90% active, such as about 20% to about 60% active, have been found to result in highly desirable dispersions.

The dispersion may also comprise other ingredients that can impart additional properties to the dispersion. For example, the dispersion may include a scale inhibitor, a corrosion inhibitor, or a bactericide, so long as the ingredient does not de-stabilize or break the dispersion. In fact, however, it has been found that certain imidazoline corrosion inhibitors act as emulsifying or dispersing aids; that is, not only do they inhibit corrosion, but they help stabilize the dispersion. Exemplary of such imidazoline corrosion inhibitors are reaction products of tall oil fatty acid with diethylenetriamine or fatty amine condensates generally. Such imidazoline corrosion inhibitors are disclosed in U.S. Pat. Nos. 4,746,328, 5,062,992, 5,152,177, 5,504,063 and 5,459,125, each of which is incorporated herein by reference. Other corrosion inhibitors, such as fatty acid derivatives (e.g., dimer acids and trimer acids) have been found to be useful as well. These additional ingredients are preferably oil soluble.

The dispersions of this invention may be produced as follows. An organic phase is prepared by adding the dispersant to the crystal modifier composition, typically with heat to facilitate dissolution of the dispersant in the crystal modifier composition. Or, if the organic phase is a solid at ambient temperature, it is heated to maintain it in liquid form. The relative amounts should be such that the dispersant will be present in the ultimate dispersion in an amount sufficient to impart at least meta-stability to the dispersion.

Generally, this concentration is about 2 to about 10 weight percent based on the total resulting dispersion. If the dispersion is to contain any other organic phase components, such as a scale inhibitor, a corrosion inhibitor, a freezing point depressant, an asphaltene inhibitor, or a bactericide, they are also added to the organic phase at this point.

The organic phase is then added to water at a rate and with sufficient agitation—and with the water maintained at a sufficient temperature (usually near boiling)—to disperse the organic phase throughout the water in an organic phase weight average particle size of at most about 50 microns, preferably up to about 25 microns, more preferably up to about 10 microns, especially up to about 7 microns, such as up to about 5 microns. These sizes refer to the size sieve opening through which the particles can pass. Those of ordinary skill in the art will readily recognize how to control these factors to achieve the dispersion and will be able to adapt and to coordinate them for particular formulations without undue experimentation. Preferably, the organic phase is added to the water in a proportion such that the resulting crystal modifier concentration in the dispersion is from about 10 to about 70% by weight, more preferably about 10 to about 50% by weight, most preferably about 20 to about 40% by weight. In a preferred embodiment, if the crystal modifier is dissolved in an aromatic hydrocarbon solvent, the dispersion contains up to about 50% by weight aromatic hydrocarbon solvent. Generally, the dispersions are at least of 25% by weight water. The dispersant is typically dispersed in the water phase and around or in the organic phase.

The resulting dispersion comprises the dispersant and the organic crystal modifier composition dispersed through a continuous water phase, the dispersion having a viscosity at 25° C. of less than about 50,000 centipoise, preferably about 5,000 centipoise to about 15,000 centipoise. For dispersions intended to be used to treat hydrocarbon/water mixtures, the dispersion generally has a density between that of water and the hydrocarbon in the fluid being treated. It may then tend to locate at the interface between the water and the hydrocarbon. Thus, the density is less than 1 gm./cm$^3$ and greater than the petroleum or petroleum-derived liquid. For example, if the liquid is crude oil, which has a density generally from about 0.75 to about 0.96 gm./cm$^3$, the density of the dispersion should be between at least about 0.75 and about 1 gm./cm$^3$, depending on the density of the actual crude being treated, but more typically from about 0.85 to about 1 gm./cm$^3$, preferably from about 0.9 to about 1 gm./cm$^3$, especially from about 0.96 to about 1 gm./cm$^3$, such as about 0.97 gm./cm$^3$, depending on the density of the particular crude oil.

The dispersion may be applied to the petroleum or petroleum-derived fluid by a batch application. For example, if added to an oil well, a charge of the dispersion is added as a batch through the annulus of the well and then flushed to the desired location downhole with brine or production fluid. The dispersion is particularly well suited for off-shore use due to its physical properties of high concentration, ease of handling, multifunctionality, and so forth. The amount to be added will vary from well to well. This will be readily recognized by those of ordinary skill in the art, as will suitable amounts for addition. The dispersion then releases the crystal modifier continuously over an extended period, and formulations can be prepared, for example, to release about 50 to about 100 ppm active crystal modifier for weeks or months before a new charge of dispersion is required. Similarly the other active ingredients incorporated into the dispersion may be released slowly for continuous treatment.

Thus, whereas traditional batch treatments of wells involves batch additions and prompt return of the additive with production, thereby requiring constant retreatment, the batch addition of the composition of this invention permits a continuous treatment over an extended period of time.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples, all percentages are given on a weight basis unless otherwise indicated.

EXAMPLE 1

Several crystal modifier compositions were prepared and their melting points measured. First, an ester composition corresponding to an 87% by weight mixture of $C_{30}$ alpha olefin/maleic anhydride alternating copolymer (number average molecular weight about 5,000) that has been 75 mole % esterified with $C_{20+}$ alcohols dissolved in xylene bottoms (high mesitylene content) was prepared. It was found to have an approximate melting point of 135° F. (about 57° C.). The ester was diluted further with more of the xylene bottoms to form a 54% active mixture having an approximate melting point of 105° F. (about 41° C.), and diluted even further to form a 3% active mixture having an approximate melting point of 25° F. (about −4° C.). A 21% mixture of the imide reaction product of $C_{24-28}$ alpha olefin/maleic anhydride copolymer (molecular weight about 5,000) and Armeen HT (hydrogenated tallow amine) in xylene bottoms was prepared and found to have an approximate melting point of 35° F. (about 2° C.). Finally, a mixture was prepared containing 18% of the noted ester and 5% of the noted imide in xylene bottoms (for a total active concentration of 23%) and found to have an approximate pour point of 40° F. (about 4° C.).

EXAMPLE 2

A dispersion of this invention was prepared as follows. Distilled water was heated to 200–205° F. (about 95° C.) and held at that temperature. An 87% by weight solution of $C_{30}$ alpha olefin/maleic anhydride copolymer (number average molecular weight about 5,000) that has been 75 mole % esterified with $C_{20+}$ alcohols (as disclosed in U.S. Pat. No. 2,561,232 to Rudel et al. and assigned to Standard Oil) dissolved in xylene bottoms (high mesitylene content) was heated to 240–250° F. (about 120° C.) and maintained at 245° F. (about 118° C.). A 90% solution of imidazoline corrosion inhibitor (sold by Petrolite Corporation under the trade designation CRO-111) was added slowly to the hot olefin/maleic anhydride copolymer ester solution with agitation in a weight ratio of about 13:29 (an active weight ratio of about 10:21). The temperature of the resulting ester/corrosion inhibitor mixture was maintained at 245° F. (about 118° C.) and held there for five minutes beyond the completion of the addition. A 25% solution of the imide reaction product of $C_{24-28}$ alpha olefin/maleic anhydride copolymer (molecular weight about 5,000) and Armeen HT (hydrogenated tallow amine), was then added to the ester/corrosion inhibitor mixture at 245° F. (about 118° C.) in a weight ratio of about 8:13 and the resulting imide/ester/corrosion inhibitor mixture was then held at that temperature for five minutes. An ethoxylated aliphatic compound of approximately forty carbon atoms and having a backbone of about 24 to about 26 carbon atoms ethoxylated with ethylene oxide in a weight ratio of ethylene oxide to the backbone of approximately 1:1 (number average molecular weight about 900; HLB=10) was then added to the imide/ester/corrosion inhibitor mixture at 245° F. (about 118° C.) in a weight ratio of about 3:35 and the resulting mixture was stirred until all ingredients were melted and well mixed. The melted, stirred mixture was then added slowly to the hot distilled water in a weight ratio of about 8:7. Significant agitation and a temperature of about 205° F. (about 96° C.) were maintained during the addition and for 3 to 5 minutes thereafter. The product was then cooled at a rate of about 3 to 5° F. (about 1½ to about 3° C.) per minute with mild agitation until the product reached 100° F. (about 38° C.).

EXAMPLE 3

A well was treated on days 1 and 20 with the product prepared as described in Example 2, above (10 gallons per treatment), by batch addition of the product, followed by flushing. The pour point of the well fluid was measured, with the following results:

| DAY | POUR POINT (°F.) |
|---|---|
| 1 | *42 |
| 2 | <0 |
| 3 | 20 |
| 4 | 30 |
| 5 | 26 |
| 6 | 30 |
| 7 | 28 |
| 8 | 32 |
| 9 | 32 |
| 10 | 26 |
| 11 | 26 |
| 12 | 26 |
| 13 | 30 |
| 14 | 30 |
| 15 | 23 |
| 16 | 22 |
| 17 | 24 |
| 18 | 20 |
| 19 | 20 |
| 20 | 14 |
| 22 | 10 |
| 23 | 6 |

*(prior to treatment)

EXAMPLE 4

Crudes obtained from several wells were treated for paraffin deposition inhibition with various concentrations of the product prepared as described in Example 2. The weight % of paraffin deposition inhibited was measured for each crude for each of the crystal modifier concentrations, with the following results:

| Crude #1 | |
|---|---|
| Crystal Modifier Concentration (ppm by weight) | Paraffin Deposition Inhibition (wgt. %) |
| 50 | 43 |
| 100 | 33 |
| 200 | 61 |
| 300 | 81 |
| 400 | 83 |

| Crude #2 | |
|---|---|
| Crystal Modifier Concentration (ppm by weight) | Paraffin Deposition Inhibition (wgt. %) |
| 126 | 22 |
| 252 | 35 |
| 504 | 82 |
| 756 | 65 |
| 1008 | 55 |

| Crude #3 | |
|---|---|
| Crystal Modifier Concentration (ppm by weight) | Paraffin Deposition Inhibition (wgt. %) |
| 125 | 94 |
| 250 | 97 |
| 500 | 85 |
| 750 | 98 |

| Crude #4 | |
|---|---|
| Crystal Modifier Concentration (ppm by weight) | Paraffin Deposition Inhibition (wgt. %) |
| 125 | 73 |
| 250 | 91 |
| 500 | 95 |
| 750 | 97 |

In view of the above, it will be seen that the several advantages of the invention are achieved and other advantageous results attained.

As various changes could be made in the above methods and compositions without departing from the scope of the invention, it is intended that all matter contained in the above description shall be interpreted as illustrative and not in a limiting sense.

What is claimed is:

1. An aqueous external dispersion useful as a crystal modifier for petroleum or a petroleum-derived liquid, comprising a wax dispersant, an organic crystal modifier composition dispersed through a continuous water phase, and an organic solvent, the organic solvent being present in the dispersion in an amount such that the crystal modifier makes up from about 3% to about 87% by weight of the total of the crystal modifier and the organic solvent in the dispersion, and the wax dispersant being present in the dispersion in the amount sufficient to impart at least meta-stability to the dispersion, and the dispersion having a viscosity at 25° C. of less than about 50,000 centipoise.

2. An aqueous external dispersion as set forth in claim 1 wherein the dispersion has a viscosity at 25° C. of from about 5,000 centipoise to about 15,000 centipoise.

3. An aqueous external dispersion as set forth in claim 1 having a density less than 1 gm./cm$^3$ and greater than the petroleum or petroleum-derived liquid.

4. An aqueous external dispersion as set forth in claim 3 having a density greater than about 0.75 gm./cm$^3$.

5. An aqueous external dispersion as set forth in claim 1 wherein the dispersant comprises a non-ionic surfactant selected from the group consisting of ethoxylated hydrocarbons having a carbon chain of at least about eighteen carbon atoms in length and ethoxylated hydrocarbons of shorter chain length, provided however that if the non-ionic surfactant is an ethoxylated hydrocarbon of shorter chain length, the dispersant further comprises an ionic surfactant in an amount such that the dispersant has an HLB of from about 6 to about 18.

6. An aqueous external dispersion as set forth in claim 1 wherein the dispersant is an ethoxylated aliphatic alcohol having a backbone of number average length of about 20 to about 50 carbon atoms ethoxylated with ethylene oxide in a weight ratio of ethylene oxide to the backbone of approximately 1:0.5 to approximately 1:2.

7. An aqueous external dispersion as set forth in claim 5 wherein the dispersant is a combination of (a) nonylphenol ethoxylated in an ethylene oxide to nonylphenol molar ratio of approximately 4:1, and (b) dodecylbenzylsulfonic acid, in a proportion of (a) to (b) sufficient to produce an HLB of the combination of about 6 to about 18.

8. An aqueous external dispersion as set forth in claim 5 wherein the dispersant is a non-ionic ethoxylated hydrocarbon surfactant having a carbon chain of at least about eighteen carbon atoms in length.

9. An aqueous external dispersion as set forth in claim 1 wherein the organic crystal modifier composition comprises an olefin/maleic anhydride copolymer having weight average molecular weight of from about 3,000 to about 10,000.

10. An aqueous external dispersion as set forth in claim 9 wherein the copolymer is of an acid, diacid, ester, diester, acid/ester, anhydride, amide or imide form, or a combination thereof.

11. An aqueous external dispersion as set forth in claim 10 wherein the organic solvent is an aromatic hydrocarbon solvent.

12. An aqueous external dispersion as set forth in claim 1 wherein the organic crystal modifier composition comprises an olefin/maleic anhydride copolymer having weight average molecular weight of from about 3,000 to about 10,000.

13. An aqueous external dispersion as set forth in claim 9 wherein the crystal modifier is also a paraffin deposition inhibitor.

14. An aqueous external dispersion as set forth in claim 1 wherein the organic crystal modifier composition is dispersed in the form of particles having a weight average particle size of up to about 50 microns.

15. An aqueous external dispersion as set forth in claim 1 further comprising at least one other agent selected from the group consisting of oil soluble corrosion inhibitors, scale inhibitors, asphaltene inhibitors, bactericides and freezing point depressants.

16. An aqueous external dispersion as set forth in claim 11 wherein the dispersion contains up to about 50% by weight aromatic hydrocarbon solvent.

17. A method for crystal modification of petroleum or a petroleum-derived liquid, comprising adding to the petroleum or petroleum-derived liquid an aqueous external dispersion as set forth in claim 1.

18. A method as set forth in claim 17 wherein the dispersion is added to the petroleum or petroleum-derived liquid as a batch treatment and the dispersion releases the crystal modifier composition to the petroleum or petroleum-derived liquid continuously over an extended period of time.

19. A method as set forth in claim 17 wherein the dispersion has a viscosity at 25° C. of from about 5,000 centipoise to about 15,000 centipoise.

20. A method as set forth in claim 17 wherein the aqueous external dispersion has a density less than 1 gm./cm.$^3$ and greater than that the petroleum or petroleum-derived liquid.

21. A method as set forth in claim 17 wherein the dispersant is a combination of surfactants.

22. A method as set forth in claim 17 wherein the dispersant is an ethoxylated aliphatic compound having a backbone number average length of about 20 to about 50 carbon atoms ethoxylated with ethylene oxide in a weight ratio of ethylene oxide to the backbone of approximately 1:0.5 to approximately 1:2.

23. A method as set forth in claim 21 wherein the dispersant is a combination of (a) nonylphenol ethoxylated in an ethylene oxide to nonylphenol molar ratio of approximately 4:1, and (b) dodecylbenzylsulfonic acid, in a proportion of (a) to (b) sufficient to produce an HLB of the combination of about 6 to about 18.

24. A method as set forth in claim 17 wherein the organic crystal modifier composition comprises an olefin/maleic anhydride copolymer having weight average molecular weight of from about 3,000 to about 10,000.

25. A method as set forth in claim 24 wherein the copolymer is of an acid, diacid, ester, diester, acid/ester, anhydride, amide or imide form, or a combination thereof.

26. A method as set forth in claim 25 wherein the organic solvent is an aromatic hydrocarbon solvent.

27. A method as set forth in claim 26 wherein the dispersant comprises a non-ionic surfactant selected from the group consisting of ethoxylated hydrocarbons having a carbon chain of at least about eighteen carbon atoms in length and ethoxylated hydrocarbons of shorter chain length, provided however that if the non-ionic surfactant is an ethoxylated hydrocarbon of shorter chain length, the dispersant further comprises an ionic surfactant in an amount such that the dispersant has an HLB of from about 6 to about 18.

28. A method as set forth in claim 24 wherein the crystal modifier is also a paraffin deposition inhibitor.

29. A method as set forth in claim 17 wherein the organic crystal modifier composition is dispersed in the form of particles having a weight average particle size of up to about 50 microns.

30. A method as set forth in claim 17 wherein the aqueous external dispersion further comprises at least one other agent selected from the group consisting of oil soluble corrosion inhibitors, scale inhibitors, bactericides, asphaltene inhibitors and freezing point depressants.

31. A method as set forth in claim 26 wherein the dispersion contains up to about 50% by weight aromatic hydrocarbon solvent.

32. A method for treating an oil well for crystal modification of petroleum in the oil well, the oil well having an annulus, comprising adding through the annulus of the well a batch of an aqueous external dispersion as set forth in claim 1, and flushing the dispersion to a desired location in the well for extended crystal modification of the petroleum in the oil well.

33. A method for preparation of an aqueous external dispersion useful as a crystal modifier for petroleum or a petroleum-derived liquid, comprising:

combining and heating a wax dispersant and an organic crystal modifier composition to form an organic phase, the dispersant comprising a non-ionic surfactant, to form a liquid organic phase; and then adding the liquid organic phase to water at a rate of addition and with sufficient agitation and with the water at a temperature to disperse the organic phase throughout the water in an organic phase weight average particle size of less than about 10 microns;

thereby to produce a dispersion comprising the dispersant and the organic crystal modifier composition dispersed through a continuous water phase the dispersion having a viscosity at 25° C. of less than about 50,000 centipoise.

34. A method as set forth in claim 17, further comprising the step of, prior to adding the aqueous external dispersion to the petroleum or petroleum-derived liquid, preparing the aqueous external dispersion by mixing together the wax dispersant and the crystal modifier to form an organic phase and then mixing the organic phase with water so as to produce the aqueous external dispersion.

35. A method as set forth in claim 17 wherein the aqueous external dispersion further comprises an imidazoline corrosion inhibitor.

36. A method as set forth in claim 35 wherein the imidazoline corrosion inhibitor is a reaction product of a tall oil fatty acid and diethylenetriamine.

37. An aqueous external dispersion as set forth in claim 1 wherein the aqueous external dispersion further comprises an imidazoline corrosion inhibitor.

38. An aqueous external dispersion as set forth in claim 1 wherein the wax dispersant has an HLB of from about 8 to about 12.

39. A method as set forth in claim 17 wherein the wax dispersant has an HLB of from about 8 to about 12.

40. A method as set forth in claim 17 wherein the addition of the dispersion improves cold flow of the petroleum or petroleum-derived liquid.

41. A method as set forth in claim 17 wherein the addition of the dispersion depresses the pour point of the petroleum or petroleum-derived liquid.

42. A method as set forth in claim 17 wherein the addition of the dispersion reduces the viscosity of the petroleum or petroleum-derived liquid.

* * * * *